US008762295B2

(12) United States Patent
Sutherland

(10) Patent No.: US 8,762,295 B2
(45) Date of Patent: Jun. 24, 2014

(54) METHODS AND SYSTEM FOR DETERMINING LICENSING/BILLING FEES FOR COMPUTER SECURITY SOFTWARE

(75) Inventor: Blake Stanton Sutherland, Stittsville (CA)

(73) Assignee: Trend Micro Incorporated, Tokyo (JP)

( * ) Notice: Subject to any disclaimer, the term of this patent is extended or adjusted under 35 U.S.C. 154(b) by 840 days.

(21) Appl. No.: 12/028,830

(22) Filed: Feb. 10, 2008

(65) Prior Publication Data

US 2008/0195560 A1    Aug. 14, 2008

Related U.S. Application Data

(60) Provisional application No. 60/889,287, filed on Feb. 11, 2007.

(51) Int. Cl.
G06F 17/00 (2006.01)
G06G 7/00 (2006.01)
G06Q 10/00 (2012.01)
G06Q 30/00 (2012.01)

(52) U.S. Cl.
USPC ........................................ 705/400; 705/7.35

(58) Field of Classification Search
USPC ....................................................... 705/400
See application file for complete search history.

(56) References Cited

U.S. PATENT DOCUMENTS

| | | | |
|---|---|---|---|
| 6,523,016 B1 | 2/2003 | Michalski | |
| 6,928,549 B2 | 8/2005 | Brock et al. | |
| 7,159,237 B2 | 1/2007 | Schneier et al. | |
| 7,181,766 B2 | 2/2007 | Bendinelli et al. | |
| 7,207,065 B2 | 4/2007 | Chess et al. | |
| 7,331,061 B1 | 2/2008 | Ramsey et al. | |
| 7,568,093 B2 | 7/2009 | Broberg et al. | |
| 7,624,447 B1 | 11/2009 | Horowitz et al. | |
| 7,656,810 B2 | 2/2010 | Horton et al. | |
| 7,913,303 B1 * | 3/2011 | Rouland et al. | 726/23 |
| 7,966,659 B1 | 6/2011 | Wilkinson et al. | |
| 2005/0257269 A1 * | 11/2005 | Chari et al. | 726/25 |
| 2006/0242706 A1 | 10/2006 | Ross | |
| 2006/0282388 A1 * | 12/2006 | Solomon et al. | 705/52 |
| 2007/0064617 A1 | 3/2007 | Reves | |
| 2007/0143851 A1 | 6/2007 | Nicodemus et al. | |
| 2007/0283441 A1 | 12/2007 | Cole et al. | |
| 2009/0106842 A1 | 4/2009 | Durie | |

OTHER PUBLICATIONS

"Citadel to Provide Security Industry's First Usage Based Pricing Model for Vulnerability Management", Business Wire, Feb. 7, 2005 published by bNET, CNET Networks Business, http://findarticles.com/p/articles/mi_m0EIN/is_2005_Feb_7/ai_n9494444.

"Citadel to Adopt Usage-Based Pricing for Hercules Vulnerability Remediation Software" by Wayne Rush, Mar. 6, 2005, "eWeek.com" http://www.eweek.com/c/a/Security/Citadel-to-Adopt-UsageBased-Pricing-for-Hercules-Vulnerability-Remediation-Software/.

* cited by examiner

*Primary Examiner* — John Hayes
*Assistant Examiner* — David J Clark
(74) *Attorney, Agent, or Firm* — IP-MEX Inc.; Victoria Donnelly

(57) ABSTRACT

Value based licensing/billing methods and system for security software is provided, which use an effective vulnerability protection measure provided by a new or updated IPS filter deployed on host computer to determine the licensing/billing fee of the new or updated IPS filter over a billing period. The effective vulnerability protection measure is determined based on vulnerability and host attributes, and, in the embodiment of the invention, is based on a vulnerability time gap or time protected of the host computer.

22 Claims, 4 Drawing Sheets

METHODS AND SYSTEM FOR DETERMINING LICENSING/BILLING FEES FOR COMPUTER SECURITY SOFTWARE

RELATED APPLICATIONS

The present invention claims benefit from the U.S. provisional application 60/889,287 filed on Feb. 11, 2007, which is incorporated herein by reference.

FIELD OF INVENTION

The present invention relates to computer security systems, and in particular, to an improved licensing and billing methods and system for computer intrusion prevention/detection systems (IPSs).

BACKGROUND OF THE INVENTION

Current licensing/billing models used in computer security systems, for example, in IPSS, follow traditional software or network services models where the cost of billing/licensing is based on perpetual license, rental or bandwidth requirements.

Unfortunately, for IPSs, none of these licensing/billing models truly reflects the real value for end customers. There are a number of drawbacks associated with applying existing software billing/licensing models to IPSs. Just to name a few, IPS, although potentially widely applicably as a protection mechanism, can be cost prohibitive for specific applications, even when it would provide effective protection; IPS can cost significantly more or less than the value it provides; there is no incentive to provide practical effective IPS solutions; there is no incentive to ensure that the IPS remains well tuned after software delivery or service purchase; and there is no incentive to reduce negative impacts of the IPS technology.

A number of alternative licensing/billing approaches for security software have been announced on the market lately, one of them is offered by Citadel Security Software Inc. The licensing model of Citadel Security Software Inc. includes a pay-as-you-go usage based pricing for vulnerability management of computer systems, where customers only pay a fixed dollar amount per each vulnerability remediation instead of paying perpetual licensing support fees according to the traditional licensing models. Below is a quote regarding the licensing model of Citadel Security Software Inc.: "This usage based pricing model allows customers to have access to Citadel's library of over 20,000 vulnerability remedies and to pay for the remediation of their networks as the remedies are applied", see articles "Citadel To Provide Security Industry's First Usage Based Pricing Model For Vulnerability Management" published by bNET, CNET Networks Business on Feb. 7, 2005 (http://findarticles.com/p/articles/mi_m0EIN/is_2005_Feb_7/ai_n9494444), and "Citadel to Adopt Usage-Based Pricing for Hercules Vulnerability Remediation Software" published online at "eWeek.com" by Wayne Rush on Mar. 6, 2005 (http://www.eweek.com/c/a/Security/Citadel-to-Adopt-UsageBased-Pricing-for-Hercules-Vulnerability-Remediation-Software/).

Although existing software licensing/billing pricing models provide certain value and flexibility to end customers, there is still a need in the industry for further development of alternative and improved software licensing/billing methods and systems, which would be particularly suitable for computer security systems.

SUMMARY OF THE INVENTION

There is an object of the invention to provide improved software licensing/billing methods and system for licensing/billing of computer security software, in particular, the software used in IPSs.

Embodiments of the present invention provide value based licensing/billing methods and system for IPSs, either as a product implemented by an end customer, or as a service delivered by a third party on behalf of a customer, based on the effort undertaken and the value delivered to the customer.

According to one aspect of the present invention, there is provided a method for determining a licensing/billing fee for computer security software deployed in a host computer for protecting the host computer against a vulnerability attack, the method comprising the steps of:
a) collecting host attributes, characterizing performance of the security software in protecting the vulnerability attack, during a billing period for the security software;
b) determining an effective vulnerability protection measure of the host computer based on the attributes collected prior to the step (b); and
c) determining the licensing/billing fee for the security software based on the effective vulnerability protection measure.

Beneficially, the step (a) further comprises collecting host attributes characterizing productivity of the security software.

The method further comprises a step (a1) of collecting vulnerability attributes characterizing the vulnerability attack, and a step (a2) of collecting asset value attributes characterizing value of assets protected by the security software, the steps (a1) and (a2) being performed before the step (b).

Thus, in the embodiments of the invention, the effective vulnerability protection measure is a function of host attributes, vulnerability attributes and asset value attributes. For example, it may be a function of host attributes, wherein the vulnerability attributes and asset value attributes are further applied in the form of a weight of factors.

Advantageously, the step (c) of the method comprises aggregating the effective vulnerability protection measure(s) across a plurality of host computers, in which the security software has been deployed.

In the method described above, the step (a) comprises collecting host attributes characterizing one or more of the following:
a vulnerability time gap of the host computer; and
a period of time during which the host computer has been protected against the vulnerability attack.

In the embodiment of the invention, the effective vulnerability protection measure is inversely proportional to the vulnerability time gap of the host computer, and proportional to a period of time during which the host computer has been protected against the vulnerability attack.

Beneficially, the effective vulnerability protection measure further includes weight factors characterizing the vulnerability attack, productivity of the security software, the value of assets protected by the security software, and cost of operating the assets.

The host attributes characterizing the productivity of the security software comprise one or more of the following:
number of packets inspected by the security software during the billing period; and
number of transactions performed by the security software during the billing period.

The host attributes characterizing performance of the security software comprise one or more of the following:
  number of software applications at the host computer protected by the security software;
  number of software application types at the host computer protected by the security software;
  number of false negatives missed by the security software;
  number of false positives triggered by the security software;
  a difference between a number of vulnerability attacks protected by the security software and a number of false positives triggered by the security software;
  number of software application protected with no false positives;
  number of vulnerability attacks protected beyond a threshold number of attacks protected; and
  network parameters of a network containing the host computer, the parameters comprising one or more of the following:
    latency;
    data throughput;
    peak load; and
    CPU load of the host computer.

Conveniently, the step (c) comprises aggregating the effective vulnerability protection measure across a plurality of host computers, in which the security software has been deployed.

The vulnerability attributes comprise one or more of the following:
  type of the vulnerability attack; and
  severity of the vulnerability attack.

The licensing/billing fee for the security software calculated during the billing period is proportional to the effective vulnerability measure.

According to another aspect of the invention, there is provided a method for determining a licensing/billing fee for security software deployed in a host computer for protecting the host computer against a vulnerability attack, comprising the steps of:
(a) collecting one or more attributes for the security software during a billing period for the security software, the attributes characterizing one or more of the following:
  vulnerability of the attack;
  performance of the security software;
  productivity of the security software; and
  value of assets protected by the security software;
(b) determining an effective vulnerability protection measure based on the collected attributes; and
(c) determining the licensing/billing fee for the security software during the billing period based on the effective vulnerability protection measure.

According to yet another aspect of the invention, there is provided a system for determining a licensing/billing fee for a computer security software deployed in a host computer for protecting the host computer against a vulnerability attack, the system comprising:
(a) an attribute collection unit operably connected to the host computer for collecting host attributes, characterizing performance of the security software, during a billing period for the security software; and
(b) a processing unit for:
  (i) determining an effective vulnerability protection measure of the host computer based on the collected attributes; and
  (ii) determining the licensing/billing fee for the security software based on the effective vulnerability protection measure.

The system further comprises a vulnerability attribute collection unit and a vulnerability assessment unit, which collect attributes characterizing the vulnerability attack and assessment of the vulnerability attack respectively.

The system further comprises an asset value calculation unit for collecting asset value attributes characterizing value of assets protected by the security software.

The system also comprises an aggregation unit for aggregating the effective vulnerability protection measure across a number of host computers, in which the security software has been deployed.

An article of manufacture is also provided, comprising a computer readable medium storing a computer code instructions for executing the steps of the method as described in claim 1.

Unlike the "one size fits all" approach of existing software licensing/billing models, the improved IPS licensing/billing methods and system are based on performance and value derived by the customer. They ensure a wider application of the benefits of the IPS technology, greater incentive to operate IPS systems effectively, greater incentives to make practical innovations in the area of computer security which provides both positive impact on security and reduction on negative impacts to the organization, and rewarding lower IPS costs to customers who have good software remediation processes.

The present invention will be more fully understood from the following detailed description of the preferred embodiments that should be read in light of the accompanying drawings.

EMBODIMENTS OF THE INVENTION

One form of software security architecture for IPS that will be used in the embodiments of the present invention includes three main components, namely "Security Center", "Deep Security Manager (DSM)", and "Agent", wherein:
"Security Center" is a server where IPS filters, Detection Rules and Expressions are defined;
"DSM" is the server portion that runs within a customer enterprise to communicate to the Security Center to receive updates, it also runs a Recommendation Engine, sends queries the Agents, and distributes security configuration to the Agents; and
"Agent" is the software that performs IPS on the host.

Figure 1:
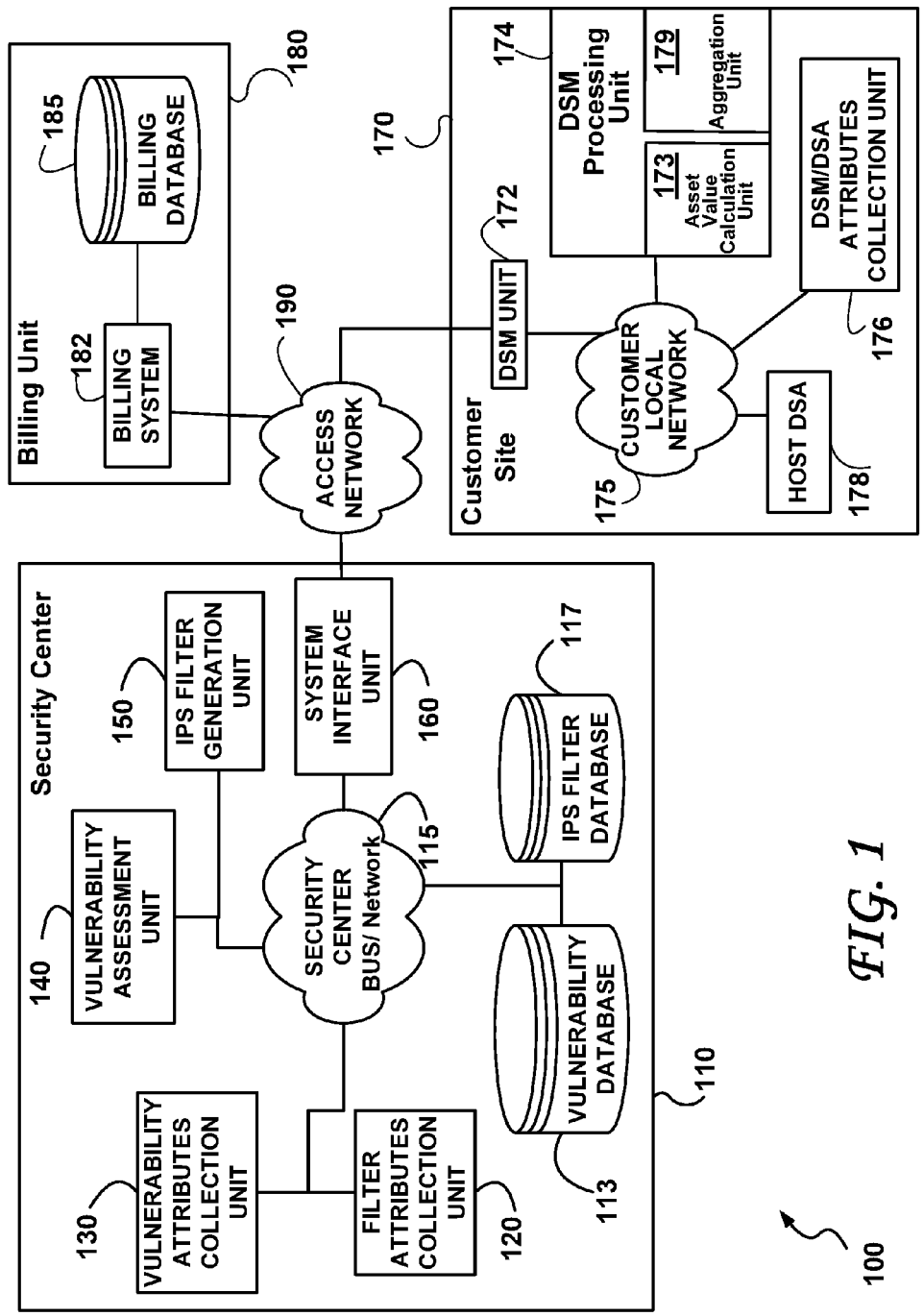
FIG. 1 shows a block diagram of a system according to an embodiment of the present invention for providing computer security and determining associated licensing/billing fees.

FIG. 1 shows a block diagram of a system 100 according to an embodiment of the present invention for providing computer security and determining associated licensing/billing fees for computer software used in providing computer security. As will be described in more detail below, the system 100 not only provides the computer security, but also measures performance and/or attributes related to the deployed security software, determines the licensing/billing fees based on the measured performance and/or attributes.

The system 100 includes a security center 110 connected to a billing unit 180 and to a customer site 170 through an access network 190.

The access network 190 can be a public network such as the Internet, a Public Switched Telephone Network (PSTN), a wireless network, a virtual private network (VPN), or any type of network providing connectivity between the security center 110, billing unit 180 and customer site 170.

In the embodiment of the invention, the security center 110 is a server including a number of processing entities, which will be described in detail below, and having a memory and CPU (not shown) for supporting the operation of those processing entities, and a bus interconnecting the memory and CPU with the processing entities.

The server bus is represented in FIG. 1 as security center Bus/Network 115.

Alternatively, the security center 110 can be a network of processing entities, each processing entity running on its own dedicated computer, the processing entities being interconnected by a network represented herein by the security center Bus/Network 115.

As shown in FIG. 1, the processing entities of the security center includes vulnerability database 113, an IPS filter database 117, a vulnerability assessment unit 140, a vulnerability attributes collection unit 130, an IPS filter generation unit 150, a filter attributes collection unit 120, and a system interface unit 160 that are connected with each other as illustrated in FIG. 1.

The vulnerability attributes collection unit 130 receives information regarding an existing or potential computer vulnerability from vulnerability disclosure sources, which can include, but are not limited to, public and private sources, software vendors, IPS vendors, IPS providers or attackers announcing a new vulnerability attack for publicity purposes, or other vulnerability disclosure sources.

The vulnerability attributes collection unit 130 gathers vulnerability attributes, which contribute to the vulnerability impact on the customer site 170, and in particular, on a DSA host 178, e.g., denial of service, crash of the host computer, loss of data, verification of protected information, a targeted software product or category of products that may be affected by the vulnerability, location of potentially vulnerable software code, or other. The collected vulnerability attributes are stored in the vulnerability database 113.

The vulnerability assessment unit 140 assesses the vulnerability based on the collected vulnerability attributes and determines whether the vulnerability can be protected against or mitigated.

The IPS filter generation unit 150 generates a set of rules including IPS filter attributes that can be included in an IPS filter update for mitigating the vulnerability. The IPS filter database 117 stores IPS filter attributes. The IPS filter database 117 as well as the vulnerability database 113 can be any proprietary or commercial database, e.g., Access database, Oracle database or other.

The system interface unit 160 provides an interface between the billing system 180 and the customer site 170.

The customer site 170 includes a customer DSM unit 172, a DSM and DSA attributes collection unit 176, a DSM Processing unit 174, the DSA host 178 and a customer local network 175 interconnecting all the elements at the customer site 170. Conveniently, the DSM Processing unit 174 includes asset value calculation unit 173, calculating value of assets protected by the security software, and an aggregation unit 179 aggregating the effective vulnerability protection measure across multiple hosts. The system interface unit 160 is also enabled to deploy IPS filter attributes to the DSM 172.

As defined earlier, the DSM unit 172 can be a server at the customer site 170, which is enabled to communicate with the Security Center 110 to receive IPS filter updates or new IPS filters. The DSM unit 172 controls one or more DSA hosts 178 (only one of which is shown in FIG. 1) by sending queries to the DSA hosts 178 and distributing security configuration to the DSA hosts 178.

The DSM unit 172 also includes a recommendation engine (not shown), which monitors processes, registries, software packages on a server where the DSM unit 172 resides, and on the DSA hosts 178, and recommends rules to be used for protecting the DSA hosts 178.

The DSA host 178 is a computer host at the customer site 170 running a Deep Security Agent (DSA), which is responsible for the security protection of the DSA host 178 from vulnerability attacks. The DSA includes one or more IPS filters that are run on the DSA host 178 and, under control of the DSM unit 172, executes requests or responds to queries from the DSM unit 172, and monitors and applies security configurations set by the DSM 172 to the DSA host 178.

In FIG. 1, the DSM/DSA attributes collection unit 176 is represented in FIG. 1 as a separate unit connected to the local network 175. Alternatively, it can be implemented as a software module running on the DSM unit 172 and/or on the DSA host 178.

In operation, the DSM/DSA attributes collection unit 176 monitors the DSA hosts 178 and the DSM unit 172, and collects host attributes related to both DSA host 178 and DSM unit 172 and reflecting the performance and/or productivity and/or value of the security software to the customer, such as time of deployment, events related to security threats, which have been mitigated or against which the DSA host 178 has been protected, a time period of the vulnerability protection, a value of the asset being protected, a cost associated with the operation of the assets, a number and type of applications being protected, performance of the IPS filter or IPS filter update deployed at the customer site 170, vulnerability conditions, for example, severity level of vulnerability impact, and other host attributes related to assets and applications being protected.

In FIG. 1, the DSM Processing unit 174 is implemented as a separate unit, for example, as a software module executed on a separate computer, which is connected to the customer local network 175. Alternatively, the DSM Processing unit 174 may be implemented as a software module running within the DSM unit 172.

The DSM Processing unit 174 receives host attributes from the DSM/DSA attributes collection unit 176, and executes licensing/billing methods of the embodiments of the present invention to determine the licensing/billing fee for the IPS filter deployment.

Although in FIG. 1 units 172, 174, and 176 are shown as being distributed in a network environment, it is contemplated that these units can be also implemented in a single computer, which would be connected to the DSA host 178 via the customer local network 175 and would provide all the functionalities of the individual units described above.

The billing unit 180 comprises a billing system 182 and a billing database 185. The billing system 182 receives the licensing/billing fees from the DSM Processing unit 174, and stores this information in the billing database 185.

In the embodiment of the present invention, the billing unit 180 is maintained by a service provider who offers vulnerability protection services and who is not the developer of vulnerability protection software. Alternatively, the service provider can be an Application Service Provider (ASP) developing vulnerability protection software and providing vulnerability protection services. In this alternative embodiment, both the security center 110 and the billing unit 180 can be maintained by the ASP.

Figure 2:
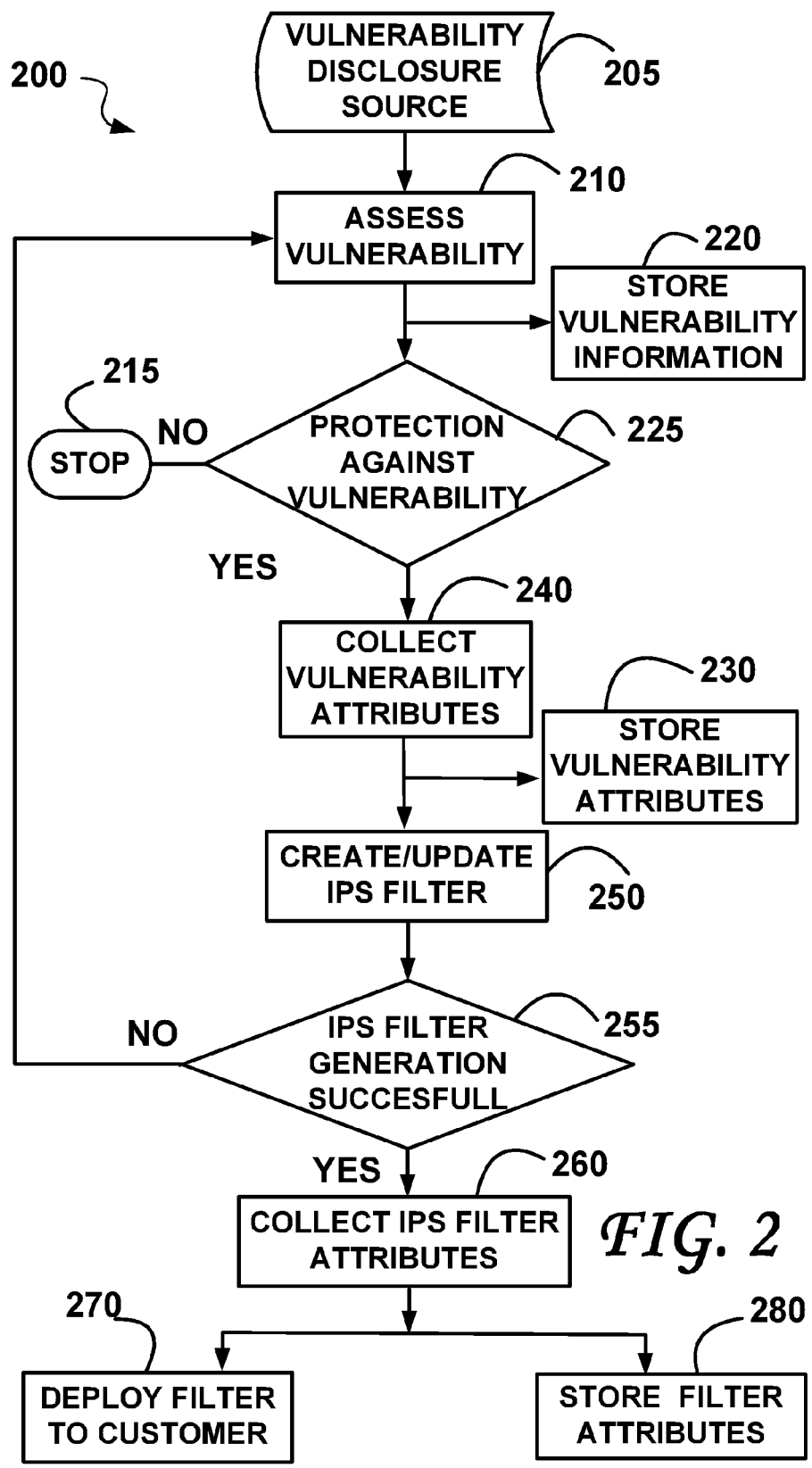
FIG. 2 shows a flowchart illustrating a method for generating filter attributes for a security filter in the IPS.

FIG. 2 shows a flowchart 200 illustrating a method for generating filter attributes for a security filter in the IPS.

Upon disclosing a new vulnerability attack from a Vulnerability Disclosure Source at step 205, the information about the new vulnerability attack is forwarded to the security center 110 of FIG. 1 for analysis and processing by the vulnerability assessment unit 140 to assess whether the new vulnerability attack can be mitigated (step 210). At step 220, information about the new vulnerability attack is stored in the vulnerability database 113 of FIG. 1. The stored information can include any of the vulnerability attributes described with regard to FIG. 1 above.

Following the assessment performed at step 210, a decision is made at step 225 if the vulnerability protection against the new vulnerability attack is available. If not (exit "No" from step 225), the method is terminated at step 215. Otherwise (exit "Yes" from step 225), the vulnerability attributes are collected at step 240 and stored in the vulnerability database 113 (step 230).

Next, based on the collected vulnerability attributes, an attempt is made, at step 250, to create a new IPS filter or to update an existing IPS filter to mitigate the new vulnerability attack. If the attempt is not successful, (exit "No" from step 255), the flowchart 200 returns back to step 210, and steps 210 to 255 are repeated a number of times until a corresponding IPS filter or its update is successfully created. If not, after a number of iterations, the flowchart 200 is terminated (termination not shown). If the attempt to create a new IPS filter or update the existing IPS filter is successful (exit "Yes" from step 255), filter attributes for the new or updated IPS filter are then collected at step 260 and stored in the IPS filter database 117 of FIG. 1 at step 280. Thus, the new or updated IPS filter is now available at the Security Center 110, and ready to be deployed to a customer at step 270.

As stated earlier, the embodiments of the present invention provide licensing/billing methods and system for security software according to a value based licensing/billing model based an effective vulnerability protection measure to determine the licensing/billing fees for deployment and exploitation of the security software. The effective vulnerability protection measure is determined by taking into account one or more of the host attributes described above and represents the perceived value provided by the vulnerability protection to the customer.

Figure 3:
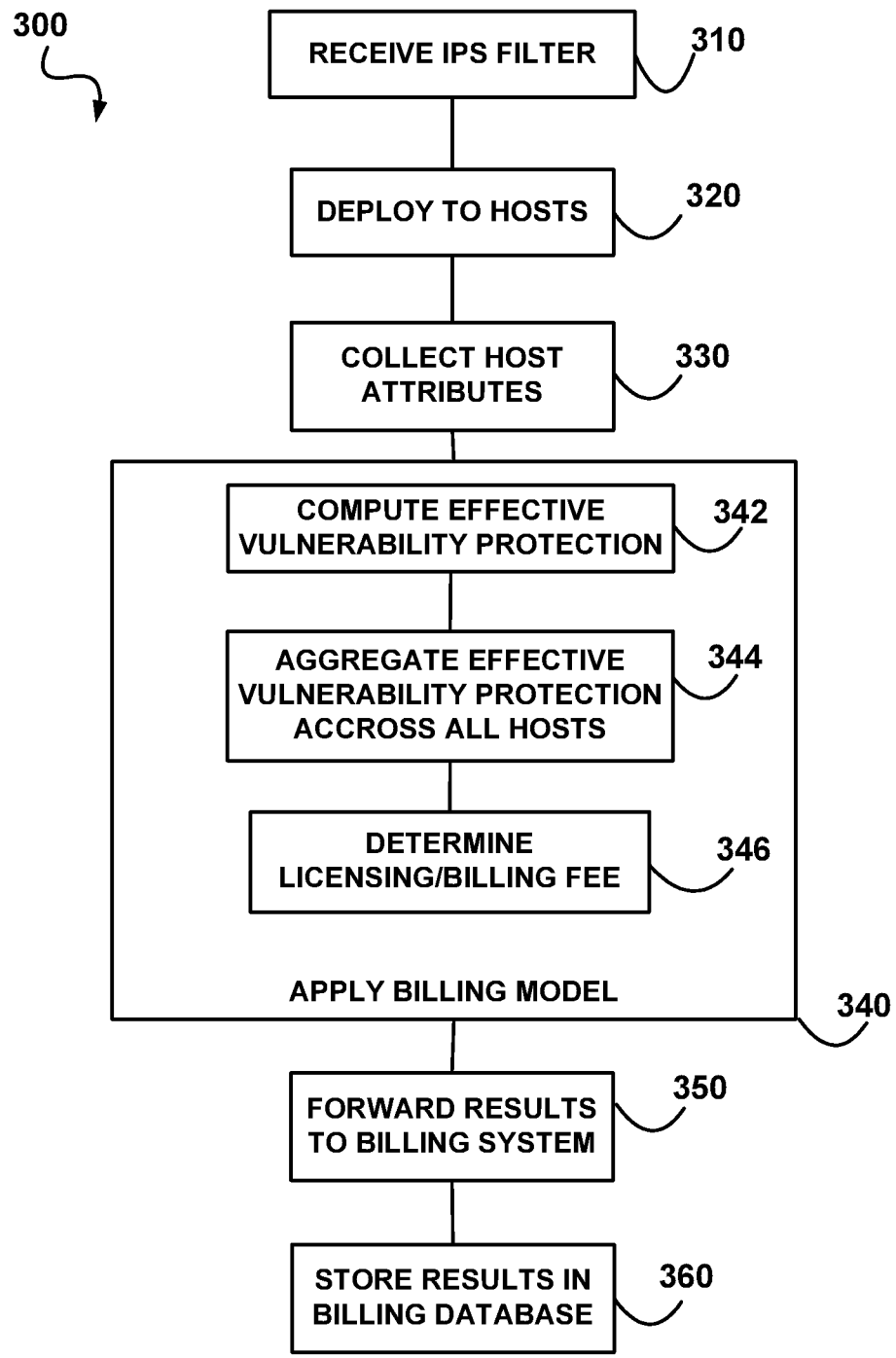
FIG. 3 shows a flowchart illustrating a method of determining the licensing/billing fees for computer security software according to the embodiment of the present invention.

FIG. 3 shows a flowchart 300 illustrating the operation of the system 100 of FIG. 1, including the steps of the method for determining the licensing/billing fees for computer security software according to the embodiment of the present invention.

As shown in FIG. 3, the new or updated IPS filter developed at the security center 110 as described with reference to FIG. 2 above, is received by the DSM unit 172 at the customer site 170 (step 310). The DSM unit 172 deploys the new or updated IPS filter to required vulnerable DSA hosts 178 at step 320 and instructs the DSM/DSA attributes collection unit 176 to collect host attributes (step 330). The collection of host attributes can be done at the DSM unit 172 via manual input through User Interface (UI), automated import, or automated detection. Host attributes may also be collected at the DSA host 178 as required.

A complete set of the collected host attributes, or any subset thereof, is forwarded to the DSM Processing Unit 174, which applies a corresponding licensing/billing method at step 340 to determine licensing/billing fees associated with the deployment and/or exploitation of the new or updated IPS filter. The results of the calculations are forwarded to the billing system at step 350, and are also stored in the billing database at step 360.

In applying the licensing billing method at step 340, the DSM Processing Unit 174 determines the effective vulnerability protection measure at step 342 based on the collected host attributes, and aggregates the effective vulnerability protection measure at step 344 across all hosts where the new or updated IPS filter has been deployed. Based on the aggregate effective vulnerability protection measure, the DSM Processing unit 174 estimates the licensing/billing fee within a billing period at step 346.

As mentioned above, the effective vulnerability protection measure is determined by using one or more host attributes.

Figure 4:
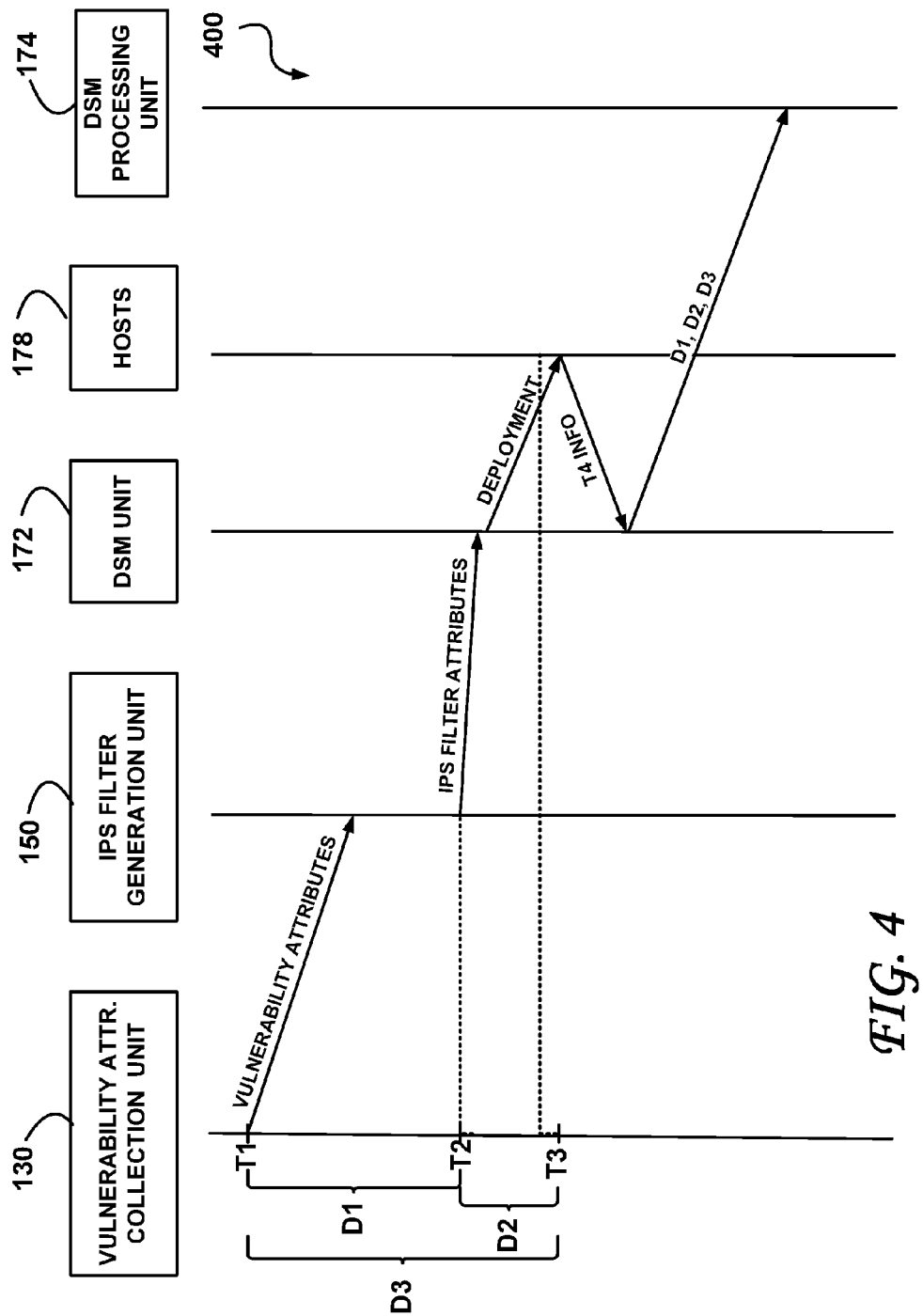
FIG. 4 shows an example of determining an effective vulnerability protection measure in step 342 of the method of FIG. 3.

FIG. 4 shows an example of determining the effective vulnerability protection measure in steps 342 of the method of FIG. 3 of the embodiment of the present invention. FIG. 4 is presented in a form of a signal flow diagram, wherein the vertical axis represents time.

In the example of FIG. 4, vulnerability attributes, filter attributes and host attributes are time instances associated with certain events. First, the time instance T1, which is the vulnerability attribute, is recorded, which is the time stamp when the new vulnerability attack is announced and gathered by the vulnerability attributes collection unit 130. As described above, once the existence of a vulnerability attack is known, the collected vulnerability attribute T1 is forwarded to the IPS filter generation unit 150 which develops a new or updated IPS filter. Upon developing the new or updated IPS filter, a filter attribute T2 introduced, which is the time instance (time stamp) T2 when the new or updated IPS filter is released, i.e. available for deployment, but not necessarily deployed by a customer.

As shown in the signal flow diagram 400, the vulnerability attribute T1 and the filter attribute T2 are forwarded to the DSM unit 172 along with the new or updated IPS filter, which is deployed to the DSA hosts 178. The time stamp T3 when the new or updated IPS filter is deployed at the DSA hosts 178 at the customer site 170 is considered to be the host attribute T3 related to the time of deployment. If an existing IPS filter effectively mitigates the vulnerability attack, T2=T1.

By defining time vulnerable, i.e. time period during which the customer is exposed to a new vulnerability attack, as D3 equal to (T3−T1), e.g., measured in days, hours or minutes from the time instance of vulnerability T1 to the time instance T3 when the new or updated IPS filter has been deployed, and time mitigated or protected as D2 corresponding to (T3−T2), e.g., time period from the time instance T2 of the release of the new or updated IPS filter to the time instance T3 when the new or updated IPS filter has been deployed, we can determine a vulnerability time gap as D1 equal to (T2−T1), e.g., as time vulnerable minus time protected. As described above, this data (D1, D2 and D3) is collected by the DSM unit 172 and forwarded to the DSM Processing Unit 174 for determining the effective vulnerability protection measure, which is equal (T3-T2) in this simple example involving one DSA host 178.

Alternatively, the vulnerability time gap D1 can be measured as (T3−T1).

The new or updated IPS filter is sometimes called a "temporary software patch", after which a permanent software patch is typically deployed instead of the IPS filter.

Accordingly, yet another time stamp T4 can be introduced when a permanent software patch has been deployed. This provides further variations in determining the time mitigated or protected D1, and the time period during which the customer is exposed to the vulnerability attack D3, for example:

$$D2 = T4-T3,$$

$$D2 = T4-T2;$$

$$D3 = T4-T1.$$

It is contemplated that other definitions of D1, D2 and D3 are also possible.

When multiple vulnerabilities and multiple hosts are involved, the effective vulnerability protection measure takes the form of time protected for the organization, for example, equal to the sum of all time protected (e.g., days) across all hosts in which new or updated IPS filters have been deployed for all vulnerabilities impacting the hosts within a given period of time (billing period), the calculation being performed at the DSM Processing unit 174. This means that the customer only actually pays for the period of time when its computer system can actually be protected, which has value to the customer.

In a modification to this embodiment, the effective vulnerability protection measure is based on the vulnerability time gap D1. In this instance, a score is associated with the duration of D1, for example, if IPS protection is delivered within "X" days of the vulnerability announcement at time T1. The licensing/billing fee is then calculated according to that score, the longer the "X" the lower the licensing/billing fee.

It is contemplated that various modifications are possible to the billing/licensing methods described in the above embodiment.

Other criteria and host attributes can be used in determining the effective vulnerability protection, which are designed to reflect the value of the security software to a customer, including one or more of the following.

1) Performance and/or productivity of the new or updated IPS filter.

Host attribute, such as confidence scoring of the new or updated IPS filter, a measure of the effectiveness of an IPS filter at achieving its desired intent without causing unexpected results, may also be taken into account alone or in combination with other attributes for licensing/billing calculations.

For example, the billing/licensing methods may additionally take into account negative impacts of the IPS filter deployed. Attributes related to false negatives, i.e. not catching attacks, false positives, i.e. preventing valid transactions from occurring, or network or system performance, e.g. CPU load, latency, data throughput, peak load, can be considered as host attributes. For example, the effective protection can be the number of IPS events protected minus the number of false positives within a given time/billing period. Alternatively it can be the number of software applications protected with no false positives within a given time/billing period.

Yet alternatively, a host attribute can include a number of IPS attacks mitigated or protected by the IPS filter. For example, if the sum of IPS attacks protected across all hosts deploying the IPS filter within a given time/billing period is determined, then the effective vulnerability protection measure is based on a number of attacks protected above a certain threshold, or a flat fee for a certain number of attacks protected, and progressively increasing payments for the attacks beyond those included in the flat fee.

In yet another modification, host attributes may relate to IPS filter performance and/or productivity, for example, the number of software applications for which the data has been inspected, and/or the number of applications being protected is taken into account, and/or the types of software applications being protected, and/or the number of connections or transactions protected, and/or the amount of data inspected.

Accordingly, respective licensing/billing fees are determined based on the number of software applications protected by the IPS filter within a given time/billing period; and/or the number of software application types protected within a given time/billing period; and/or the number of connections or transactions protected within a given time/billing period; and/or the amount of data inspected within a given time/billing period.

The number of software applications protected is obtained from the sum of all software applications protected across all hosts protected, for example, 10 protected hosts running the same protected application would count as 10, while the number of application types protected would be equal to the number of unique application types protected across all hosts protected, for example, 10 protected hosts running the same protected application would count as 1. Also the number of packets inspected by a specific IPS filter is equal to the amount of data inspected, and/or the number of connections or transactions protected.

2) Severity of the vulnerability being protected, where vulnerability attributes include respective relative scoring associated with the vulnerability attributes, and where customers pays more for protecting against vulnerabilities of higher severity and less for those of lower severity.

3) Value of assets being protected, where host attributes include respective relative scoring associated with assets being protected, and where customers pays more for protecting assets of higher value and less for those of lower value. Conveniently, weight parameters related to asset values may be applied at the DSM Processing unit 174 at the asset value calculation unit 173. As a variation to the value of assets protected, a host attribute related to the cost of operating the asset may be also introduced and taken into account in determining the licensing/billing fees for the security software.

4) Detecting an attacker who is causing the vulnerability attack, in the case where the attack cannot be protected, or it has been chosen not to prevent the attack from occurring.

5) Detecting an attacker even when the system is not vulnerable to the attack chosen.

While most of the licensing/billing methods of the embodiments of the present invention have been described for IPS, it is understood that similar principles may be equally applicable to other types of computer security systems, where the licensing/billing fees have to be made based on the performance and/or productivity of the computer security software, and the value of the security protection derived by the customer.

For example, intrusion detection without intrusion prevention may have value for certain customers. Therefore in some cases IPS filters may be kept in detection only mode, either due to a lack of confidence in the IPS filter, because the filter is known to cause false positives, or a new software vulnerability does not exist, but a customer is interested in exploring if an attacker attempts to breach on old vulnerability. In the context of licensing/billing, it may be chosen to charge a different amount depending on whether the IPS filter operates in detection or prevention mode.

It is also understood that the methods and system for determining licensing/billing fees of the embodiments of the invention may also be applied to various other types of security applications, for example, to security software used in biometric authentication such as fingerprint or eye scan recognition systems, in which the performance, productivity and value to the customer of the security software is taken into account while determining the licensing/billing fees.

In yet another modification the system described above, a network embodiment of the system is possible where the IPS protection is provided in the network while a host piece of software collects the host attributes. Yet one more modification to the system is possible, where the IPS protection is provided in the network, and host attributes are collected in the network either by passive listening, i.e. by detecting database queries going to a particular IP address "x.y.z.a.", which indicate the presence of the database at that address, or by scanning a host from the network.

Thus, improved methods and system for determining licensing/billing fees for computer security software have been provided, which are based on the performance of the computer security software and value derived by a customer using the software.

Although the invention has been illustrated with the reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A computerized method for determining a billing fee for a computer security software, the method comprising:
   in a computer having a processor configured for:
   (a) collecting asset value attributes, characterizing value of an asset protected by the security software against a vulnerability attack during a billing period for the security software; the asset value attributes excluding a value of the security software;
   (b) collecting vulnerability time gap attributes, comprising:
   a vulnerability time gap for the asset during which the asset has been exposed to the vulnerability attack; the vulnerability time gap being measured from a time instance when a new vulnerability attack has become known to a time instance when a new or updated security software for protecting against the new vulnerability attack has been released or deployed; and
   a period of time during which the asset has been protected against the vulnerability attack, measured from a time instance when the new or updated security software has been released to a time instance when the new or updated security software has been deployed; and
   (c) determining the billing fee for the security software for the billing period as a function of the asset value attributes and the vulnerability time gap attributes, wherein the billing fee is inversely proportional to the vulnerability time gap, and proportional to the period of time during which the asset has been protected against the vulnerability attack.

2. The method of claim 1, wherein the step (a) further comprises collecting asset value attributes associated with a cost of operating the asset, excluding a cost of operating the security software.

3. The method of claim 1, wherein the billing fee is directly proportional to the period of time during which the asset has been protected against the vulnerability attack.

4. The method as described in claim 1, wherein:
   the step (a) further comprises aggregating asset value attributes across a plurality of assets, in which the security software has been deployed; and
   the step (c) further comprises determining the billing fee as a function of the aggregated asset value attributes.

5. The method of claim 1, wherein:
   the step (a) further comprises collecting software productivity attributes characterizing productivity of the security software; and
   the step (c) further comprises determining the billing fee as a function of the software productivity attributes.

6. The method of claim 5, wherein the software productivity attributes comprise one or more of the following:
   number of packets inspected by the security software during the billing period; and
   number of data transactions in a computer network protected by the security software during the billing period.

7. The method of claim 1, wherein:
   the step (a) further comprises collecting software performance attributes characterizing performance of the security software; and
   the step (c) further comprises determining the billing fee as a function of the software performance attributes.

8. The method of claim 7, wherein the software performance attributes comprise one or more of the following:
   number of software applications protected by the security software;
   number of software application types protected by the security software.

9. The method of claim 7, wherein the software performance attributes comprise one or more of the following:
   number of false negatives missed by the security software; and
   number of false positives triggered by the security software.

10. The method of claim 7, wherein the software performance attributes comprise one or more of the following:
    number of vulnerability attacks protected beyond a threshold number of attacks protected; and
    network parameters of a network containing a host computer, the parameters comprising one or more of the following:
    latency;
    data throughput;
    peak load; and
    CPU load of the host computer.

11. An article of manufacture, comprising a non-transitory computer readable storage medium having computer code instructions stored thereon for execution by a processor, configured to:
    (a) collect asset value attributes, characterizing value of an asset protected by the security software against a vulnerability attack during a billing period for the security software; the asset value attributes excluding a value of the security software;
    (b) collect vulnerability time gap attributes, comprising:
    a vulnerability time gap for the asset during which the asset has been exposed to the vulnerability attack; the vulnerability time gap being measured from a time instance when a new vulnerability attack has become known to a time instance when a new or updated security software for protecting against the new vulnerability attack has been released or deployed; and
    a period of time during which the asset has been protected against the vulnerability attack, measured from a time instance when the new or updated security software has been released to a time instance when the new or updated security software has been deployed; and
    (c) determine the billing fee for the security software for the billing period as a function of the asset value attributes and the vulnerability time gap attributes, wherein the billing fee is inversely proportional to the vulnerability time gap, and proportional to the period of time during which the asset has been protected against the vulnerability attack.

12. A system for determining a billing fee for a computer security software, comprising:
   a processor, and a computer readable storage medium having computer readable instructions stored thereon for execution by the processor, forming:
      an attribute collection unit, collecting:
         asset value attributes, characterizing value of an asset protected by the security software against a vulnerability attack during a billing period for the security software; the asset value attributes excluding a value of the security software;
         vulnerability time gap attributes, comprising:
            (i) a vulnerability time gap for the asset during which the asset has been exposed to the vulnerability attack; the vulnerability time gap being measured from a time instance when a new vulnerability attack has become known to a time instance when a new or updated security software for protecting against the new vulnerability attack has been released or deployed; and
            (ii) a period of time during which the asset has been protected against the vulnerability attack, measured from a time instance when the new or updated security software has been released to a time instance when the new or updated security software has been deployed; and
      a billing unit, determining the billing fee for the security software for the billing period as a function of the asset value attributes and the vulnerability time gap attributes, wherein the billing fee is inversely proportional to the vulnerability time gap, and proportional to the period of time during which the asset has been protected against the vulnerability attack.

13. The system of claim 12, wherein the attribute collection unit is configured to further collect asset value attributes associated with a cost of operating the asset, excluding a cost of operating the security software.

14. The system as described in claim 12, wherein the billing fee is directly proportional to the period of time during which the asset has been protected against the vulnerability attack.

15. The system as described in claim 12, further comprising an aggregation unit, aggregating asset value attributes across a plurality of assets, in which the security software has been deployed; and
   wherein the billing unit is configured to determine the billing fee for the security software as a function of the aggregated asset value attributes.

16. The system of claim 12, wherein:
   the attribute collection unit is further configured to collect software productivity attributes, characterizing productivity of the security software; and
   the billing unit is further configured to determine the billing fee as a function of the software productivity attributes.

17. The system of claim 12, wherein:
   the attribute collection unit is further configured to collect software performance attributes characterizing performance of the security software; and
   the billing unit is further configured to determine the billing fee as a function of the software performance attributes.

18. The system of claim 17, wherein the software performance attributes comprise one or more of the following:
   number of false negatives missed by the security software; and
   number of false positives triggered by the security software.

19. The system of claim 17, wherein the software performance attributes comprise a difference between a number of vulnerability attacks protected by the security software and a number of false positives triggered by the security software.

20. The method of claim 7, wherein the software performance attributes comprise a difference between a number of vulnerability attacks protected by the security software and a number of false positives triggered by the security software.

21. The system of claim 17, wherein the software performance attributes comprise a number of software application protected with no false positives.

22. The method of claim 7, wherein the software performance attributes comprise a number of software application protected with no false positives.

* * * * *